(12) United States Patent
Ji et al.

(10) Patent No.: US 11,745,173 B2
(45) Date of Patent: Sep. 5, 2023

(54) TIN INCORPORATED CATALYSTS FOR GASOLINE ENGINE EXHAUST GAS TREATMENTS

(71) Applicants: JOHNSON MATTHEY PUBLIC LIMITED COMPANY, London (GB); JOHNSON MATTHEY (SHANGHAI) CHEMICALS LIMITED, Shanghai (CN)

(72) Inventors: Hongyu Ji, Shanghai (CN); Wataru Kurashige, Tochigi (JP); Shuhei Nagaoka, Tochigi (JP); Dongsheng Qiao, Shanghai (CN); Zhou Shang, Shanghai (CN); Xiaorui Zhang, Tochigi (JP)

(73) Assignees: Johnson Matthey Public Limited Company, London (GB); Johnson Matthey (Shanghai) Chemicals Limited, Shanghai (CN)

( * ) Notice: Subject to any disclaimer, the term of this patent is extended or adjusted under 35 U.S.C. 154(b) by 61 days.

(21) Appl. No.: 17/249,924

(22) Filed: Mar. 18, 2021

(65) Prior Publication Data

US 2021/0299647 A1 Sep. 30, 2021

Related U.S. Application Data

(60) Provisional application No. 63/009,606, filed on Apr. 14, 2020.

(30) Foreign Application Priority Data

Mar. 31, 2020 (CN) .......................... 202010240337.5

(51) Int. Cl.
*B01J 21/04* (2006.01)
*B01J 21/06* (2006.01)
(Continued)

(52) U.S. Cl.
CPC ......... *B01J 37/0201* (2013.01); *B01J 21/066* (2013.01); *B01J 23/42* (2013.01);
(Continued)

(58) Field of Classification Search
CPC . B01J 21/04; B01J 21/066; B01J 21/08; B01J 21/12; B01J 23/10; B01J 23/14;
(Continued)

(56) References Cited

U.S. PATENT DOCUMENTS 4,331,565 A * 5/1982 Schaefer .................. B01J 21/04
423/213.5
4,492,769 A * 1/1985 Blanchard ................ B01J 23/89
502/313
(Continued)

FOREIGN PATENT DOCUMENTS

CN 103189138 B 9/2015
CN 109894113 A 6/2019

*Primary Examiner* — Cam N. Nguyen
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate comprising an inlet end and an outlet end with an axial length L; a first catalytic region comprising a first platinum group metal (PGM) component and a first PGM support material, wherein the first catalytic region comprises up to 5 wt. % Sn.

20 Claims, 9 Drawing Sheets

(51) Int. Cl.

| | | |
|---|---|---|
| *B01J 21/08* | (2006.01) | |
| *B01J 21/12* | (2006.01) | |
| *B01J 23/10* | (2006.01) | |
| *B01J 23/14* | (2006.01) | |
| *B01J 23/42* | (2006.01) | |
| *B01J 23/44* | (2006.01) | |
| *B01J 23/46* | (2006.01) | |
| *B01J 23/62* | (2006.01) | |
| *B01J 23/63* | (2006.01) | |
| *B01J 35/00* | (2006.01) | |
| *B01J 35/02* | (2006.01) | |
| *F01N 3/10* | (2006.01) | |
| *F01N 3/28* | (2006.01) | |
| *B01J 37/02* | (2006.01) | |

(52) U.S. Cl.
CPC ......... *B01J 23/464* (2013.01); *B01J 35/0006* (2013.01); *B01J 35/023* (2013.01); *F01N 3/101* (2013.01); *F01N 3/2803* (2013.01); *F01N 2370/02* (2013.01)

(58) Field of Classification Search
CPC . B01J 23/42; B01J 23/44; B01J 23/464; B01J 23/626; B01J 23/63; B01J 35/0006; B01J 35/023; F01N 3/101; F01N 3/2803
USPC ........ 502/258–262, 302–304, 332–333, 339, 502/349, 355, 415, 439
See application file for complete search history.

(56) References Cited

U.S. PATENT DOCUMENTS

| | | | | |
|---|---|---|---|---|
| 5,063,193 A * | 11/1991 | Bedford | ............... | B01J 37/0215 423/213.2 |
| 5,413,976 A * | 5/1995 | Takami | ................... | B01J 23/63 502/64 |
| 6,030,590 A * | 2/2000 | Tabata | ..................... | B01J 23/14 423/239.1 |
| 6,239,063 B1 * | 5/2001 | Bogdan | ................... | B01J 23/63 502/355 |
| 6,399,035 B1 * | 6/2002 | Tabata | ............... | B01D 53/9418 423/239.1 |
| 6,414,209 B1 * | 7/2002 | Herskowitz | ........... | C07C 5/3337 585/661 |
| 6,685,899 B1 * | 2/2004 | Park | ..................... | B01J 23/8973 502/345 |
| 6,706,660 B2 * | 3/2004 | Park | ........................ | B01J 23/06 502/247 |
| 6,756,340 B2 * | 6/2004 | Voskoboynikov | ...... | C07C 5/325 502/328 |
| 7,056,856 B2 * | 6/2006 | Summers | ............. | B01J 37/0215 502/355 |
| 7,318,915 B2 * | 1/2008 | Jordan | ................. | B01D 53/945 502/352 |
| 7,407,907 B2 * | 8/2008 | Galperin | ................ | B01J 23/648 502/64 |
| 7,737,078 B2 * | 6/2010 | Suzuki | ................ | B01J 23/6447 502/343 |
| 7,795,174 B2 * | 9/2010 | Suzuki | ................ | B01D 53/945 502/353 |
| 7,943,104 B2 * | 5/2011 | Kozlov | ................... | B01J 23/002 502/355 |
| 8,449,852 B1 * | 5/2013 | Sung | ................... | B01J 37/0205 502/514 |
| 8,530,372 B2 * | 9/2013 | Luo | .......................... | B01J 23/83 502/343 |
| 8,680,005 B2 * | 3/2014 | Hannemann | ......... | B01J 37/0072 502/262 |
| 8,865,609 B2 * | 10/2014 | Zhou | ...................... | B01J 23/002 502/100 |
| 8,993,474 B2 * | 3/2015 | Choi | ...................... | B01J 35/1042 502/227 |
| 9,486,786 B2 * | 11/2016 | Xiao | ....................... | B01J 23/626 |
| 9,495,487 B2 * | 11/2016 | Krebs | ...................... | G01V 1/28 |
| 2003/0134744 A1 * | 7/2003 | Blankenship | ............ | B01J 37/18 208/143 |
| 2003/0136708 A1 * | 7/2003 | Crane | ...................... | B01J 21/04 208/138 |
| 2003/0148882 A1 * | 8/2003 | Chen | .................... | B01J 23/8966 502/328 |
| 2003/0230029 A1 * | 12/2003 | Ruettinger | ............. | B01J 23/626 48/128 |
| 2004/0236121 A1 * | 11/2004 | Chen | ..................... | C07C 67/055 549/326 |
| 2005/0081443 A1 * | 4/2005 | Aiello | ...................... | B01J 23/58 48/198.3 |
| 2007/0134145 A1 * | 6/2007 | Strehlau | ............... | B01D 53/945 502/326 |
| 2007/0238605 A1 * | 10/2007 | Strehlau | ................ | B01J 23/626 502/79 |
| 2007/0244002 A1 | 10/2007 | Kozlov | | |
| 2009/0185967 A1 | 7/2009 | Demourgues et al. | | |
| 2010/0140137 A1 | 6/2010 | Deluga et al. | | |
| 2010/0196789 A1 * | 8/2010 | Fisher | ................ | H01M 4/8605 502/4 |
| 2012/0093703 A1 * | 4/2012 | Lewis | ...................... | B01J 35/10 502/343 |
| 2012/0316061 A1 * | 12/2012 | Nagami | ................ | H01M 4/8803 502/352 |
| 2013/0102819 A1 * | 4/2013 | Szesni | ...................... | B01J 23/628 502/328 |
| 2013/0165700 A1 * | 6/2013 | Zhou | ..................... | C07C 29/149 502/328 |
| 2013/0165701 A1 * | 6/2013 | Zhou | ..................... | B01J 23/6527 502/328 |
| 2013/0178669 A1 * | 7/2013 | Zhou | ..................... | C07C 29/153 568/885 |
| 2014/0200384 A1 * | 7/2014 | Kauffman | ................ | B01J 37/08 502/213 |
| 2019/0193056 A1 * | 6/2019 | Hayashi | ................ | B01J 35/0053 |
| 2020/0030775 A1 | 1/2020 | Kitamoto | | |
| 2020/0391187 A1 | 12/2020 | Ji | | |

* cited by examiner

TIN INCORPORATED CATALYSTS FOR GASOLINE ENGINE EXHAUST GAS TREATMENTS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalytic conversion catalysts, are widely utilized to reduce the amount of these pollutants emitted to atmosphere. A commonly used catalyst for gasoline engine exhaust treatments is the TWC (three way catalyst). TWCs perform three main functions: (1) oxidation of CO; (2) oxidation of unburnt HCs; and (3) reduction of $NO_x$.

Despite advances in TWC technology, there remains a need for improved catalytic converters for certain engine platforms that simultaneously improve the performance in cold start stage, give better light off performance, as well as at hot transient stage, give better OSC performance, with wide range of Pd and/or Pt applications. This invention solves these problems amongst others.

SUMMARY OF THE INVENTION

One aspect of the present disclosure is directed to a catalyst composition comprising a platinum group metal (PGM) component and a PGM support material, wherein the catalyst composition comprises up to 5 wt. % Sn.

Another aspect of the present disclosure is directed to a catalytic article for treating exhaust gas comprising: a substrate comprising an inlet end and an outlet end with an axial length L; a first catalytic region comprising a first platinum group metal (PGM) component and a first PGM support material, wherein the first catalytic region comprises up to 5 wt. % Sn.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

BRIEF DESCRIPTION OF THE DRAWINGS

FIG. 2b depicts a variation of FIG. 2a.

FIG. 3b depicts a variation of FIG. 3a.

FIG. 4b depicts a variation of FIG. 4a.

FIGS. 5b, 5c, and 5d depict variations of FIG. 5a.

FIGS. 6b and 6c depict variations of FIG. 6a.

FIGS. 7b-7f depict variations of FIG. 7a.

DETAILED DESCRIPTION OF THE INVENTION

Figure 1:
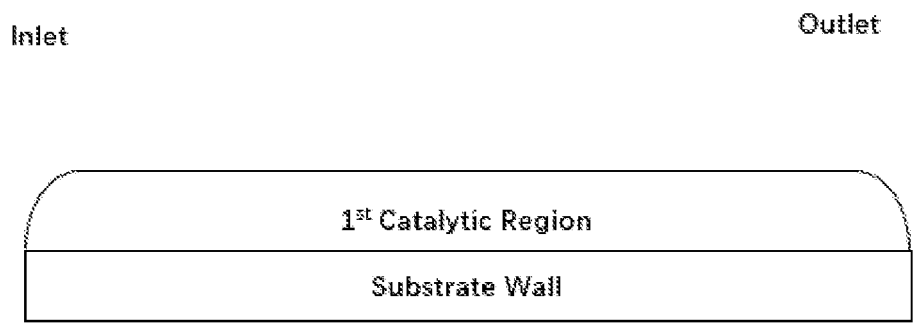
FIG. 1 shows one embodiment according to the present invention, which contains first catalytic region with a length of 100% to the axial length L of the substrate (single layer).
Figure 2A:
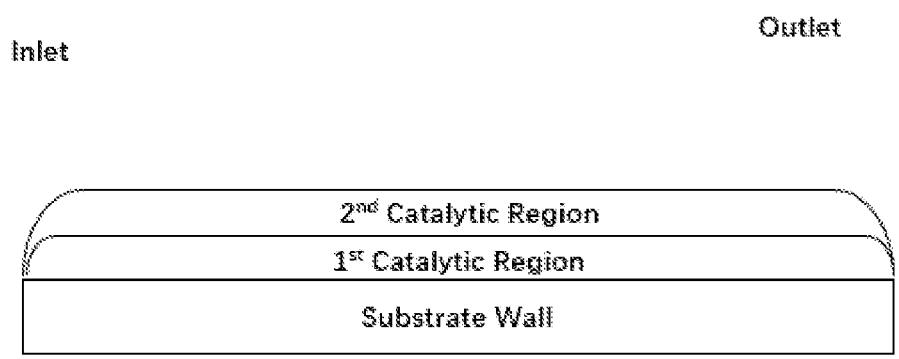
FIG. 2a shows one embodiment according to the present invention, the first catalytic region extends 100% of the axial length L, as bottom layer; the second catalytic region extends 100% of the axial length L, as top layer.
Figure 2B:
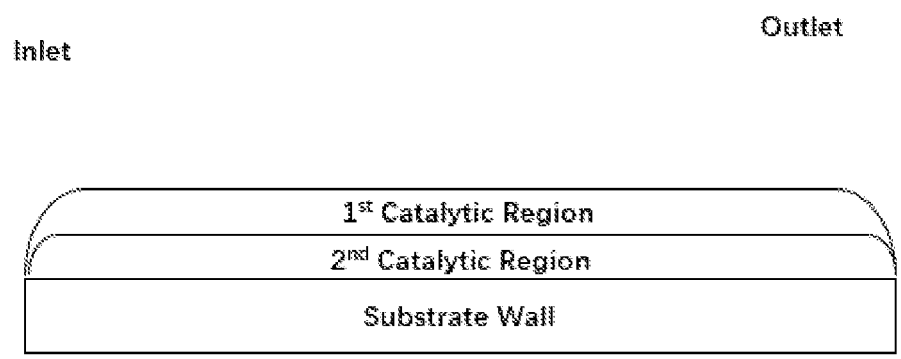

The present invention is directed to the catalytic treatment of combustion exhaust gas, such as that produced by gasoline and other engines, and to related catalysts compositions, catalytic articles, and systems. More specifically, the invention relates the simultaneous treatment of $NO_x$, CO, and HC in a vehicular exhaust system. Although, most of technology development to improve thermal durability of TWC have been focused on increasing a specific surface are (SSA) of OSC materials after thermal aging, the inventors have surprisingly discovered that enhancement of OSC functions in the wide range of temperature promoted by Sn doping is much impacting on the improved thermal durability of TWC and resulting emission control performance. The inventors have discovered that TWC potential performance under light off and OSC tests as well as the substantial performance under several emission control tests were improved with this invention. The processes of the present invention also reduce costs of the catalyst.

One aspect of the present disclosure is directed to a catalyst composition comprising a platinum group metal (PGM) component and a PGM support material, wherein the catalyst composition comprises up to 5 wt. % Sn.

Through intensive research, the inventors have found that by incorporating minor amount of tin (Sn) into the TWC catalyst compositions, these novel compositions have demonstrated excellent catalytic properties (e.g., all the emissions, THC/NMHC, CO and $NO_x$ emission could get significant reduced during vehicle testing by using the tin containing catalyst as described in this invention, Moreover, PGM dispersion and stabilization after hash aging also get improved when Tin introduced into TWC catalyst compositions).

Throughout the application, "wt. % Sn" is calculated based on $SnO_2$.

The PGM component can be selected from the group consisting of platinum, palladium, rhodium, and a combination thereof. In some embodiments, the PGM component can be Pd, Rh or a mixture thereof. In other embodiments, the PGM component can be platinum. In yet other embodiments, the PGM component can be platinum and rhodium; palladium and rhodium; or platinum, palladium, and rhodium.

The PGM support material can be an oxygen storage capacity (OSC) material, an inorganic oxide, or a combination thereof.

The OSC material can be cerium oxide, zirconium oxide, a ceria-zirconia mixed oxide, an alumina-ceria-zirconia mixed oxide, or a combination thereof. More preferably, the OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. In addition, the OSC material may function as a support material for the PGM component. In some embodiments, the OSC material comprises the ceria-zirconia mixed oxide and the alumina-ceria-zirconia mixed oxide.

The inorganic oxide is preferably an oxide of Groups 2, 3, 4, 5, 13 and 14 elements. The inorganic oxide is preferably selected from the group consisting of alumina, magnesia, silica, zirconia, barium oxides, and mixed oxides or composite oxides thereof. Particularly preferably, the inorganic oxide is alumina, lanthanum-alumina, zirconia, or a magnesia/alumina composite oxide. One especially preferred inorganic oxide is alumina or lanthanum-alumina.

The OSC material and the inorganic oxide can have a weight ratio of no greater than 10:1; preferably, no greater than 8:1 or 5:1; more preferably, no greater than 4:1 or 3:1; most preferably, no greater than 2:1.

Alternatively, the OSC material and the inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the OSC material and the inorganic oxide can have a weight ratio of no less than 2:1. In further embodiments, the OSC material and the inorganic oxide can have a weight ratio of no less than 10:1. In another further embodiments, the OSC material and the inorganic oxide can have a weight ratio of no less than 20:1 or no less than 30:1. In yet another further embodiments, the OSC material and the inorganic oxide can have a weight ratio of no less than 40:1 or no less than 50:1.

The catalyst composition may further comprise an alkali or alkaline earth metal.

The alkali or alkaline earth metal is preferably barium, or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the catalyst composition.

Preferably the barium or the strontium is present as $BaCO_3$ or $SrCO_3$. Such a material can be performed by any method known in the art, for example incipient wetness impregnation or spray-drying.

Tin (Sn) can be incorporated into the catalyst composition in various ways. In some embodiments, Sn can be incorporated into the OSC material as dopant and the OSC material can comprise up to 5 wt. % Sn; preferably, up to 4 wt. % Sn; more preferably, up to 3 wt. % Sn; even more preferably, up to 2 wt. % Sn, based on the total weight of the OSC material. Alternatively, the OSC material can comprise 0.1 to 5 wt. % Sn; preferably, 0.1 to 4 wt. % Sn; more preferably, 0.1 to 3 wt. % Sn; even more preferably, 0.1 to 2.5 wt. % Sn, based on the total weight of the OSC material. In other embodiments, Sn can be incorporated into the inorganic oxide as dopant and the inorganic oxide can comprise up to 5 wt. % Sn; preferably, up to 4 wt. % Sn; more preferably, up to 3 wt. % Sn; even more preferably, up to 2 wt. % Sn, based on the total weight of the inorganic oxide. Alternatively, the inorganic oxide can comprise 0.1 to 5 wt. % Sn; preferably, 0.2 to 4 wt. % Sn; more preferably, 0.3 to 3 wt. % Sn; even more preferably, 0.4 to 2 wt. % Sn, based on the total weight of the inorganic oxide. In yet other embodiments, Sn can be incorporated into the catalyst composition as simple physical mixture. For example, Sn will be incorporated as $SnO_2$ to be physically blended with the OSC material and/or the inorganic oxide and the catalyst composition can comprise up to 5 wt. % Sn; preferably, up to 4 wt. % Sn; more preferably, up to 3 wt. % Sn; even more preferably, up to 2 wt. % Sn, based on the total weight of the catalyst composition. Alternatively, the catalyst composition can comprise 0.1 to 5 wt. % Sn; preferably, 0.2 to 4 wt. % Sn; more preferably, 0.3 to 3 wt. % Sn; even more preferably, 0.4 to 2 wt. % Sn, based on the total weight of the catalyst composition. In other embodiments, Sn can be incorporated into the OSC material framework. In other embodiments, Sn can be incorporated into the OSC material framework (e.g., Sn doped into the crystal lattice of the OSC solid solution material as formed) and the OSC material framework can comprise up to 5 wt. % Sn; preferably, up to 4 wt. % Sn; more preferably, up to 3 wt. % Sn; even more preferably, up to 2 wt. % Sn, Alternatively, the OSC material can comprise 0.1 to 5 wt. % Sn; preferably, up 0.1 to 4 wt. % Sn; more preferably, 0.1 to 3 wt. % Sn; even more preferably, 0.1 to 2.5 wt. % Sn, based on the total weight of the OSC material.

In some embodiments, the catalyst composition can comprise up to 5 wt. % Sn; preferably, up to 3 wt. % Sn; more preferably, up to 2 wt. % Sn; most preferably, up to 1 wt. % or 0.5 wt. % Sn, based on the total weight of the catalyst composition. Alternatively, the catalyst composition can comprise 0.1 to 5 wt. % Sn; preferably, 0.1 to 4 wt. % Sn; more preferably, 0.2 to 3 wt. % Sn; even more preferably, even more preferably, 0.4 to 1.5 wt. % Sn, based on the total weight of the catalyst composition.

As demonstrated in the Examples below, the catalyst compositions in this aspect can be applied as a TWC catalyst for treating exhaust gas produced by gasoline engines.

Another aspect of the present disclosure is directed to a catalytic article for treating exhaust gas comprising: a substrate comprising an inlet end and an outlet end with an axial length L; a first catalytic region comprising a first platinum group metal (PGM) component and a first PGM support material, wherein the first catalytic region comprises up to 5 wt. % Sn.

First Catalytic Region

The first PGM component can be selected from the group consisting of platinum, palladium, rhodium, and a combination thereof. In some embodiments, the first PGM component can be Pd, Rh or a mixture thereof. In other embodiments, the first PGM component can be platinum. In yet other embodiments, the first PGM component can be platinum and rhodium; palladium and rhodium; or platinum, palladium, and rhodium. In further embodiments, the first PGM component can be platinum and rhodium; or platinum, palladium, and rhodium The first PGM support material can be a first oxygen storage capacity (OSC) material, a first inorganic oxide, or a combination thereof.

The first OSC material can be cerium oxide, zirconium oxide, a ceria-zirconia mixed oxide, an alumina-ceria-zirconia mixed oxide, or a combination thereof. More preferably, the first OSC material comprises the ceria-zirconia mixed oxide, the alumina-ceria-zirconia mixed oxide or a combination thereof. The ceria-zirconia mixed oxide can further comprise dopants, such as lanthanum, neodymium, praseodymium, yttrium oxides, etc. The first OSC material may function as a support material for the first PGM component (e.g., as the first PGM support material). In some embodiments, the first OSC material comprises the ceria-zirconia mixed oxide and the alumina-ceria-zirconia mixed oxide.

The first inorganic oxide is preferably an oxide of Groups 2, 3, 4, 5, 13 and 14 elements. The first inorganic oxide is preferably selected from the group consisting of alumina, magnesia, silica, zirconia, barium oxides, and mixed oxides or composite oxides thereof. Particularly preferably, the first inorganic oxide is alumina, lanthanum-alumina, zirconia, or a magnesia/alumina composite oxide. One especially preferred first inorganic oxide is alumina or lanthanum-alumina.

The first OSC material and the first inorganic oxide can have a weight ratio of no greater than 10:1; preferably, no greater than 8:1 or 5:1; more preferably, no greater than 4:1 or 3:1; most preferably, no greater than 2:1.

Alternatively, the first OSC material and the first inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the first OSC material and the first inorganic oxide can have a weight ratio of no less than 2:1. In further embodiments, the first OSC material and the first inorganic oxide can have a weight ratio of no less than 10:1. In another further embodiments, the first OSC material and the first inorganic oxide can have a weight ratio of no less than 20:1 or no less than 30:1. In yet another further embodiments, the first OSC material and the first inorganic oxide can have a weight ratio of no less than 40:1 or no less than 50:1.

The first catalytic region may further comprise a first alkali or alkaline earth metal.

The first alkali or alkaline earth metal is preferably barium, or strontium, and mixed oxides or composite oxides thereof. Preferably the barium or strontium, where present, is loaded in an amount of 0.1 to 15 wt. %, and more preferably 3 to 10 wt. % of barium or strontium, based on the total weight of the first catalytic region.

Preferably the barium or the strontium is present as $BaCO_3$ or $SrCO_3$. Such a material can be performed by any method known in the art, for example incipient wetness impregnation or spray-drying.

Tin (Sn) can be incorporated into the first catalytic region in various ways. In some embodiments, Sn can be incorporated into the first OSC material as dopant and the first OSC material can comprise up to 5 wt. % Sn; preferably, up to 4 wt. % Sn; more preferably, up to 3 wt. % Sn; even more preferably, up to 2 wt. % Sn, based on the total weight of the first OSC material. Alternatively, the first OSC material can comprise 0.1 to 5 wt. % Sn; preferably, 0.1 to 4 wt. % Sn; more preferably, 0.1 to 3 wt. % Sn; even more preferably, 0.1 to 2.5 wt. % Sn, based on the total weight of the first OSC material. In other embodiments, Sn can be incorporated into the first inorganic oxide as dopant and the first inorganic oxide can comprise up to 5 wt. % Sn; preferably, up to 4 wt. % Sn; more preferably, up to 3 wt. % Sn; even more preferably, up to 2 wt. % Sn, based on the total weight of the first inorganic oxide. Alternatively, the first inorganic oxide can comprise 0.1 to 5 wt. % Sn; preferably, 0.2 to 4 wt. % Sn; more preferably, 0.3 to 3 wt. % Sn; even more preferably, 0.4 to 2 wt. % Sn, based on the total weight of the first inorganic oxide. In yet other embodiments, Sn can be incorporated into the first catalytic region as simple physical mixture (e.g., physical blend). For example, Sn can be incorporated as $SnO_2$ to be physically blended with the first OSC material and/or the first inorganic oxide and the first catalytic region can comprise up to 5 wt. % Sn; preferably, up to 4 wt. % Sn; more preferably, up to 3 wt. % Sn; even more preferably, up to 2 wt. % Sn, based on the total weight of the first catalytic region. Alternatively, the first catalytic region can comprise 0.1 to 5 wt. % Sn; preferably, 0.2 to 4 wt. % Sn; more preferably, 0.3 to 3 wt. % Sn; even more preferably, 0.4 to 2 wt. % Sn, based on the total weight of the first catalytic region. In other embodiments, Sn can be incorporated into the first OSC material framework (e.g., Sn doped into the crystal lattice of the OSC solid solution material as formed) and the first OSC material framework can comprise up to 5 wt. % Sn; preferably, up to 4 wt. % Sn; more preferably, up to 3 wt. % Sn; even more preferably, up to 2 wt. % Sn. Alternatively, the OSC material can comprise 0.1 to 5 wt. % Sn; preferably, 0.1 to 4 wt. % Sn; more preferably, 0.1 to 3 wt. % Sn; even more preferably, 0.1 to 2.5 wt. % Sn, based on the total weight of the first OSC material.

In some embodiments, the first catalytic region can comprise up to 5 wt. % Sn; preferably, up to 3 wt. % Sn; more preferably, up to 2 wt. % Sn; most preferably, up to 1.5 wt. % or 1 wt. % Sn, based on the total weight of the first catalytic region. Alternatively, the first catalytic region can comprise 0.1 to 5 wt. % Sn; preferably, 0.2 to 4 wt. % Sn; more preferably, 0.3 to 3 wt. % Sn; even more preferably, 0.4 to 1.5 wt. % Sn, based on the total weight of the first catalytic region.

As demonstrated in the Examples below, the catalyst article in this aspect can be applied as a TWC catalyst for treating exhaust gas produced by gasoline engines.

The first catalytic region can extend for 100 percent of the axial length L. (E.g., see FIGS. 1, 2a, 2b, and 6a-6c). In some embodiments, the first catalytic region can extend for 20 to 99%, 30 to 90%, or 40-80% of the axial length L. Alternatively, the first catalytic region can extend for 30 to 70 percent of the axial length L. Preferably, for 40 to 60 percent, more preferably, 45 to 55 percent of the axial length L, (E.g., see FIGS. 3a-5d and 7a-7l).

The total washcoat loading of the first catalytic region can be less than 3.5 g/in$^3$; preferably, less than 3.0 g/in$^3$ or 2.5 g/in$^3$. Alternatively, the total washcoat loading of the first catalytic region can be from 0.5 to 3.5 g/in$^3$; preferably, can be from 0.6 to 3 g/in$^3$ or 0.7 to 2.5 g/in$^3$.

Second Catalytic Region

The catalytic article may further comprise a second catalytic region.

The second catalytic region can further comprise a second PGM component, a second oxygen storage capacity (OSC) material, a second alkali or alkaline earth metal component, and/or a second inorganic oxide.

The second PGM component can be selected from the group consisting of platinum, palladium, rhodium, and a mixture thereof. In some embodiments, the second PGM component can be Pd, Rh or a mixture thereof.

The second OSC material can be cerium oxide, zirconium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 70:30. Alternatively, the ceria-zirconia mixed oxide also can have a weight ratio of ceria to zirconia less than 50:50, preferably, less than 40:60, more preferably, less than 30:70.

The second OSC material (e.g., ceria-zirconia mixed oxide) can be from 10 to 90 wt. %; preferably, 25-75 wt. %; more preferably, 30-60 wt. %, based on the total washcoat loading of the second catalytic region.

The second OSC material loading in the second catalytic region can be less than 2 g/in$^3$. In some embodiments, the second OSC material loading in the second catalytic region is no greater than 1.5 g/in$^3$, 1.2 g/in$^3$, 1 g/in$^3$, 0.8 g/in$^3$, or 0.7 g/in$^3$.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The second inorganic oxide is preferably an oxide of Groups 2, 3, 4, 5, 13 and 14 elements. The second inorganic oxide is preferably selected from the group consisting of alumina, magnesia, silica, zirconia, barium oxides, and mixed oxides or composite oxides thereof. Particularly preferably, the second inorganic oxide is alumina, lanthanum-alumina, zirconia, or a magnesia/alumina composite oxide. One especially preferred second inorganic oxide is alumina or lanthanum-alumina.

The second OSC material and the second inorganic oxide can have a weight ratio of no greater than 10:1; preferably, no greater than 8:1 or 5:1; more preferably, no greater than 4:1 or 3:1; most preferably, no greater than 2:1.

Alternatively, the second OSC material and the second inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the second OSC material and the second inorganic oxide can have a weight ratio of no less than 2:1. In further embodiments, the second OSC material and the second inorganic oxide can have a weight ratio of no less than 10:1. In another further embodiments, the second OSC material and the second inorganic oxide can have a weight ratio of no less than 20:1 or no less than 30:1. In yet another further embodiments, the second OSC material and the second inorganic oxide can have a weight ratio of no less than 40:1 or no less than 50:1.

The total washcoat loading of the second catalytic region can be less than 3.5 g/in$^3$; preferably, less than 3.0 g/in$^3$ or 2.5 g/in$^3$. Alternatively, the total washcoat loading of the first catalytic region can be from 0.5 to 3.5 g/in$^3$; preferably, can be from 0.6 to 3 g/in$^3$ or 0.7 to 2.5 g/in$^3$.

In some embodiments, the second catalytic region can comprise up to 5 wt. % Sn.

Tin (Sn) can be incorporated into the second catalytic region in various ways. In some embodiments, Sn can be incorporated into the second OSC material as dopant and the second OSC material can comprise up to 5 wt. % Sn; preferably, up to 4 wt. % Sn; more preferably, up to 3 wt. % Sn; even more preferably, up to 2 wt. % Sn, based on the total weight of the second OSC material. Alternatively, the second OSC material can comprise 0.1 to 5 wt. % Sn; preferably, 0.2 to 4 wt. % Sn; more preferably, 0.3 to 3 wt. % Sn; even more preferably, 0.4 to 2 wt. % Sn, based on the total weight of the second OSC material. In other embodiments, Sn can be incorporated into the second inorganic oxide as dopant and the second inorganic oxide can comprise up to 5 wt. % Sn; preferably, up to 4 wt. % Sn; more preferably, up to 3 wt. % Sn; even more preferably, up to 2 wt. % Sn, based on the total weight of the second inorganic oxide. Alternatively, the second inorganic oxide can comprise 0.1 to 5 wt. % Sn; preferably, 0.2 to 4 wt. % Sn; more preferably, 0.3 to 3 wt. % Sn; even more preferably, 0.4 to 2 wt. % Sn, based on the total weight of the second inorganic oxide. In yet other embodiments, Sn can be incorporated into the second catalytic region as simple physical mixture (e.g., physical blend). For example, Sn can be incorporated as $SnO_2$ to be physically blended with the second OSC material and/or the second inorganic oxide and the second catalytic region can comprise up to 5 wt. % Sn; preferably, up to 4 wt. % Sn; more preferably, up to 3 wt. % Sn; even more preferably, up to 2 wt. % Sn, based on the total weight of the second catalytic region. Alternatively, the second catalytic region can comprise 0.1 to 5 wt. % Sn; preferably, 0.2 to 4 wt. % Sn; more preferably, 0.3 to 3 wt. % Sn; even more preferably, 0.4 to 1.5 wt. % Sn, based on the total weight of the second catalytic region. In other embodiments, Sn can be incorporated into the second OSC material framework (e.g., Sn doped into crystal lattice of OSC solid solution material as formed) and the second OSC material framework can comprise up to 5 wt. % Sn; preferably, up to 4 wt. % Sn; more preferably, up to 3 wt. % Sn; even more preferably, up to 2 wt. % Sn, based on the total weight of the second OSC material, alternatively, the second OSC material can comprise 0.1 to 5 wt. % Sn; preferably, 0.1 to 4 wt. % Sn; more preferably, 0.1 to 3 wt. % Sn; even more preferably, 0.1 to 2.5 wt. % Sn, based on the total weight of the second OSC material.

In some embodiments, the second catalytic region can comprise up to 4 wt. % Sn; preferably, up to 3 wt. % Sn; more preferably, up to 2 wt. % Sn; most preferably, up to 1.5 wt. % or 1 wt. % Sn, based on the total weight of the second catalytic region. Alternatively, the second catalytic region can comprise 0.1 to 5 wt. % Sn; preferably, 0.2 to 4 wt. % Sn; more preferably, 0.3 to 3 wt. % Sn; even more preferably, 0.4 to 1.5 wt. % Sn, based on the total weight of the second catalytic region.

The second catalytic region can extend for 100 percent of the axial length L. (E.g., see FIGS. 2a, 2b, and 6a-6c)

The second catalytic region can extend for 30 to 70 percent of the axial length L. Preferably, for 40 to 60 percent, more preferably, 45 to 55 percent of the axial length L. and most preferably, the total length of the second region and the first region is equal or greater than the axial length L (E.g., see FIGS. 3a-5d and 7a-7l).

Figure 3A:
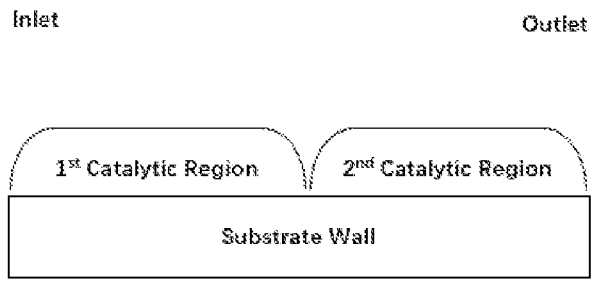
FIG. 3a shows one embodiment according to the present invention, the first catalytic region extends less than 100% of the axial length L, from the inlet end; the second catalytic region extends less than 100% of the axial length L, from the outlet end. The total length of the second and the first catalytic region is equal or less than the axial length L.
Figure 3B:
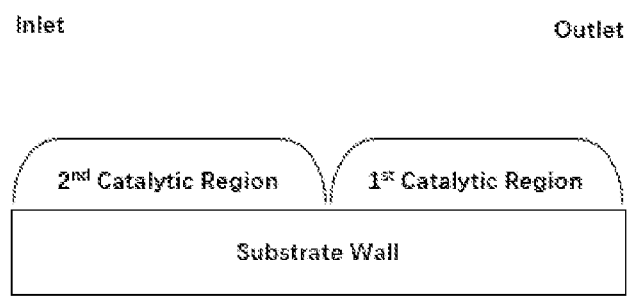
Figure 3C:
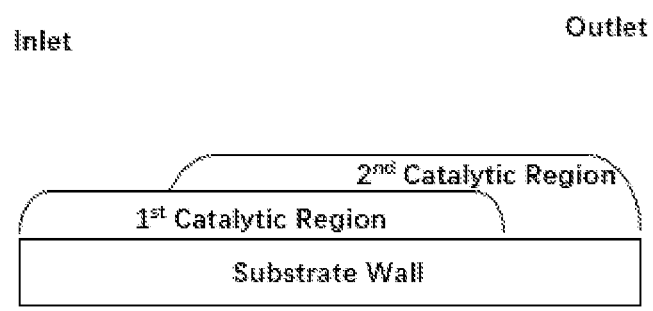
FIG. 3c shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L.
Figure 3D:
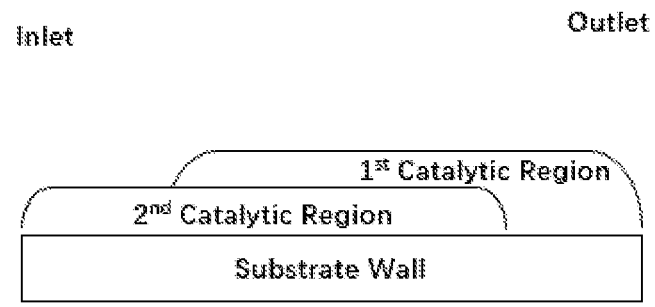
FIG. 3d depicts a variation of FIG. 3c.
Figure 4A:
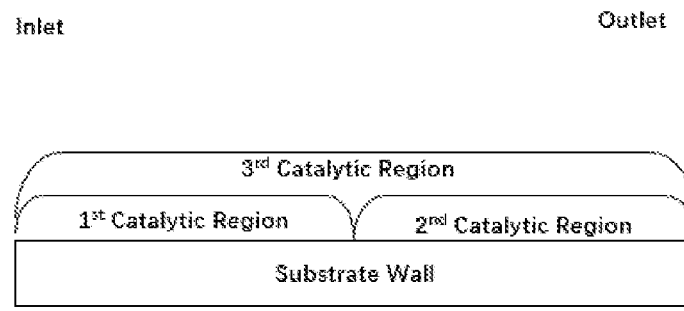
FIG. 4a shows one embodiment according to the present invention, the first catalytic region extends less than 100% of the axial length L, from the inlet end; the second catalytic region extends less than 100% of the axial length L, from the outlet end. The total length of the second and the first catalytic region is less than or equal to the axial length L. The $3^{rd}$ catalytic region extends 100% of the axial length L and overlies the first and second catalytic regions as top layer.
Figure 4B:
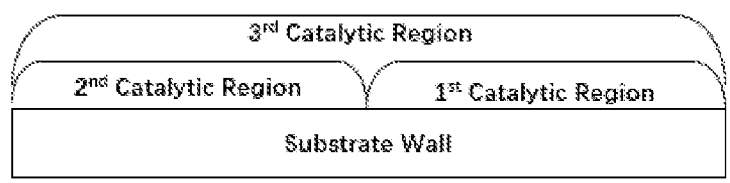
Figure 4C:
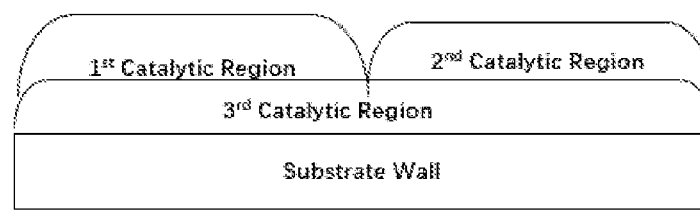
FIG. 4c shows one embodiment according to the present invention, the $3^{rd}$ catalytic region extends 100% of the axial length L as bottom layer. The first catalytic region extends less than 100% of the axial length L, from the inlet end; the second catalytic region extends less than 100% of the axial length L, from the outlet end. The total length of the second and the first catalytic region is less than or equal to the axial length L.
Figure 4D:
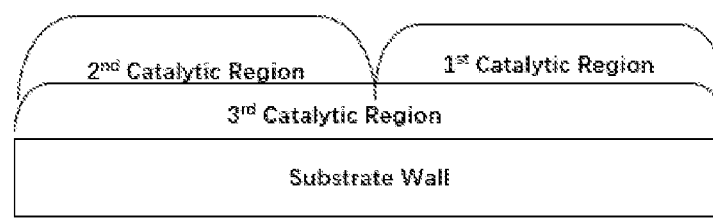
FIG. 4d depicts a variation of FIG. 4c.
Figure 5A:
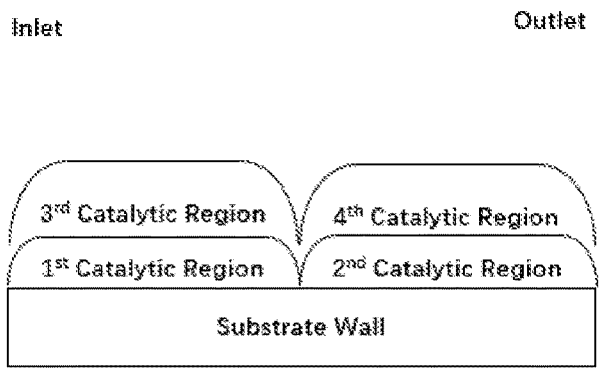
FIG. 5a shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The third catalytic region extends less than 100% of the axial length L, from the inlet end; the fourth catalytic region extends less than 100% of the axial length L, from the outlet end. The total length of the third and the fourth catalytic region can be less than, equal to, or greater than the axial length L. The first and second catalytic regions constitutes bottom layer; and the third and fourth catalytic regions constitutes top layer.
Figure 5B:
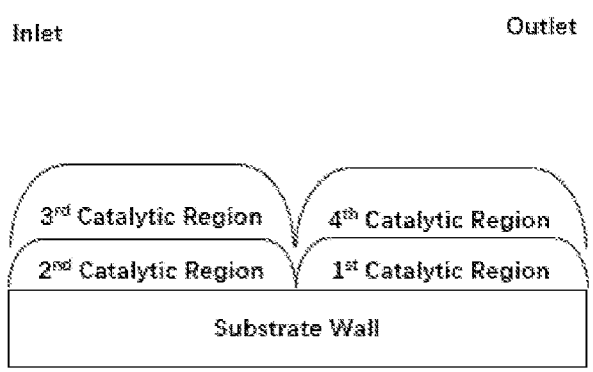
Figure 5C:
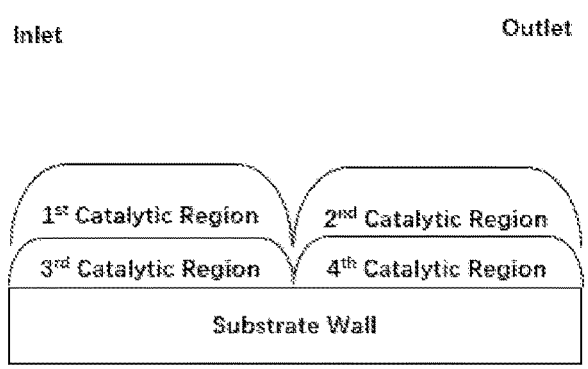
Figure 5D:
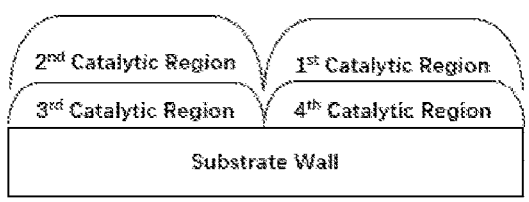
Figure 6A:
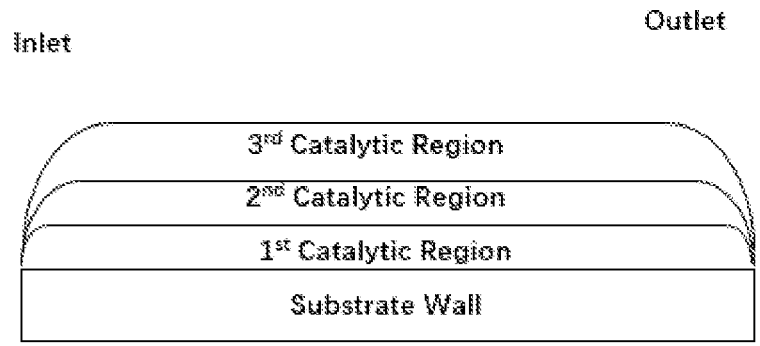
FIG. 6a shows one embodiment according to the present invention, the first catalytic region extends 100% of the axial length L, as bottom layer; the second catalytic region extends 100% of the axial length L, as middle layer; and the third catalytic region extends 100% of the axial length L, as top layer.
Figure 6B:
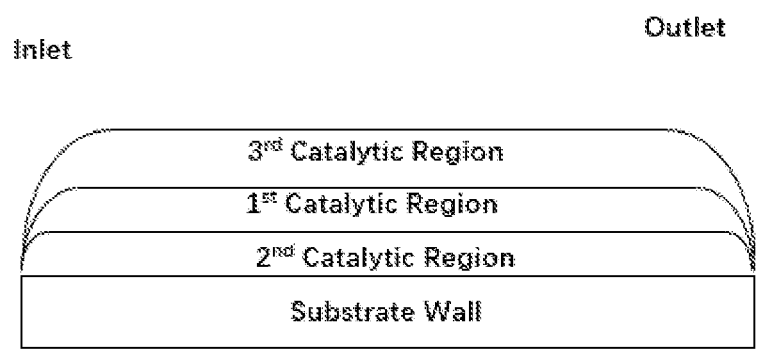
Figure 6C:
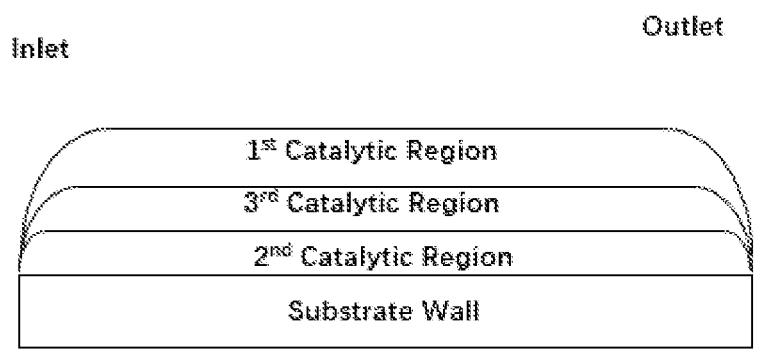
Figure 7A:
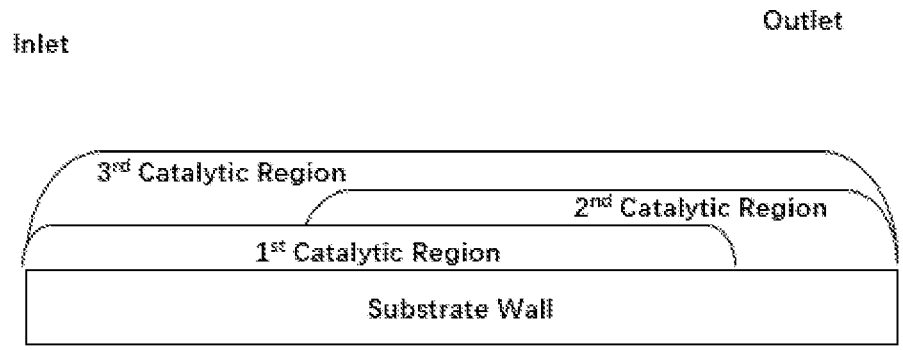
FIG. 7a shows one embodiment according to the present invention, the first catalytic region extends less than 100% of the axial length L, from the inlet end; the second catalytic region extends less than 100% of the axial length L, from the outlet end. The total length of the second and the first catalytic region is greater than the axial length L. The $3^{rd}$ catalytic region extends 100% of the axial length L and overlies the first and second catalytic regions as top layer.
Figure 7B:
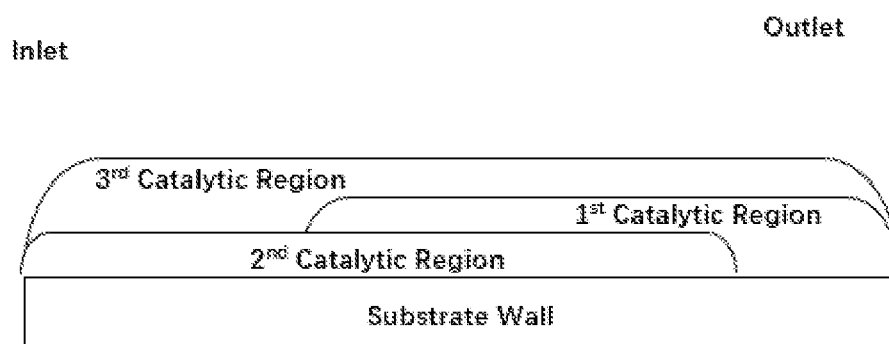
Figure 7C:
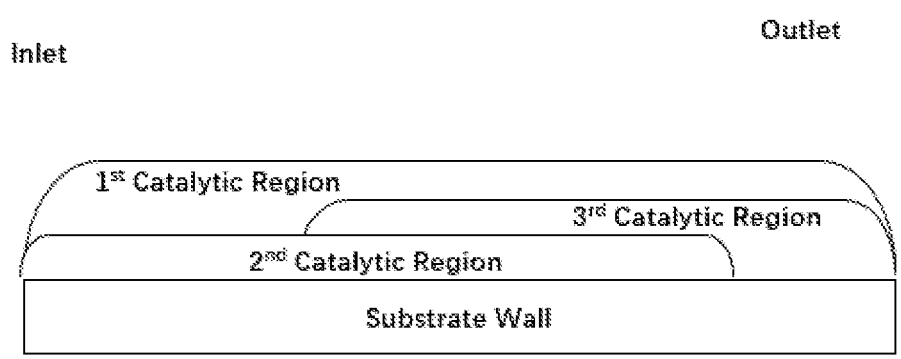
Figure 7D:
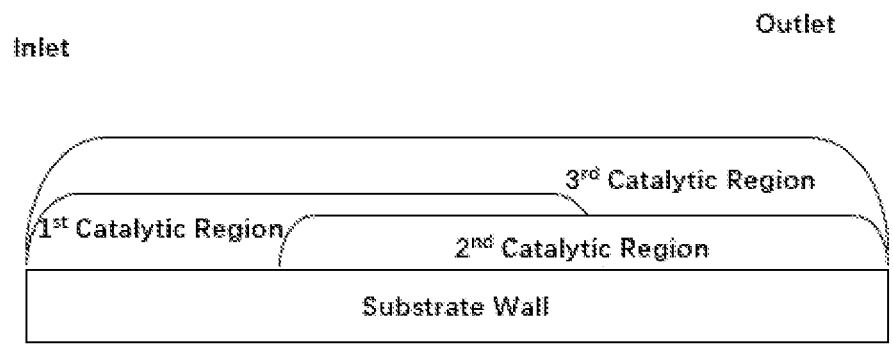
Figure 7E:
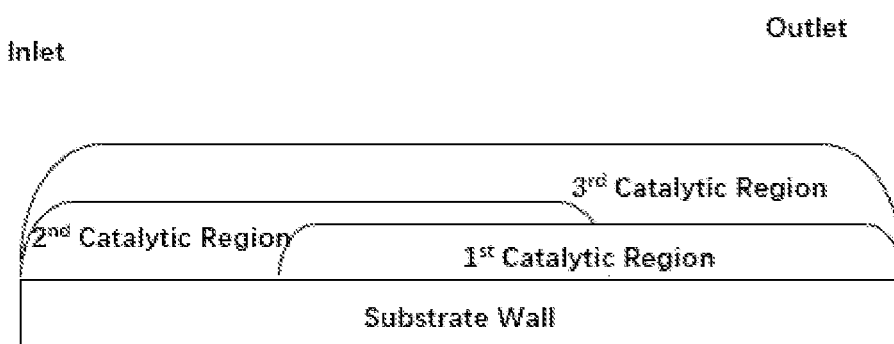
Figure 7F:
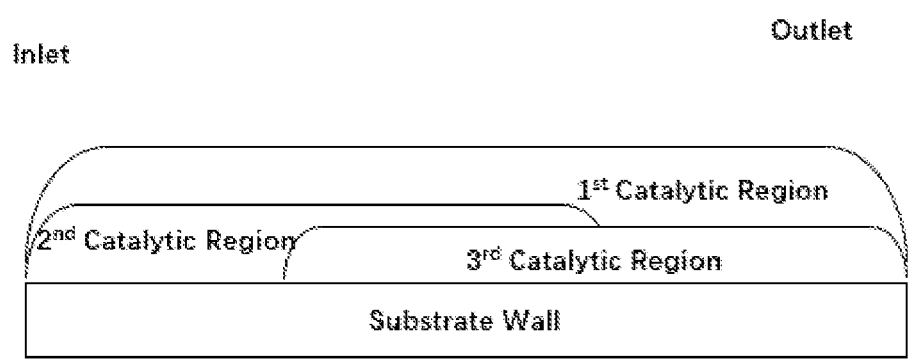
Figure 7G:
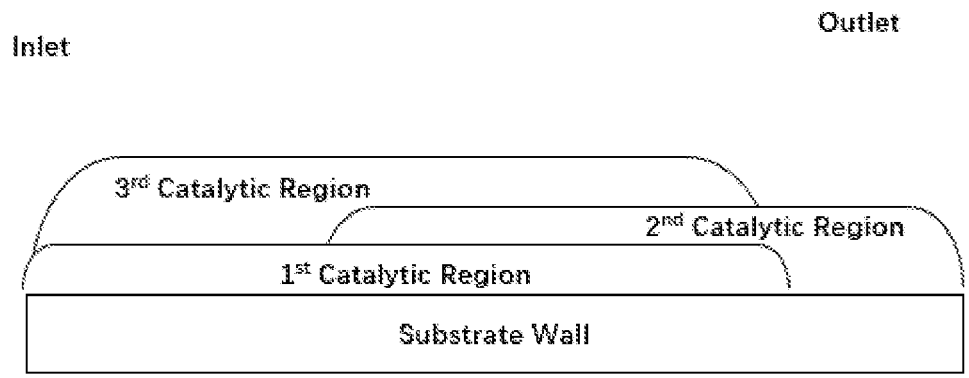
FIG. 7g shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The $3^{rd}$ catalytic region extends less than 100% of the axial length L from the inlet end and at least partially overlies the first and/or second catalytic regions.
Figure 7H:
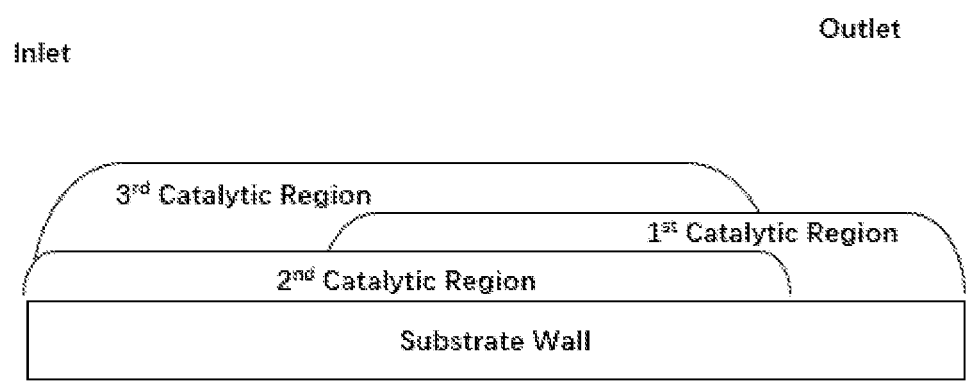
FIGS. 7h and 7i depict variations of FIG. 7g.
Figure 7I:
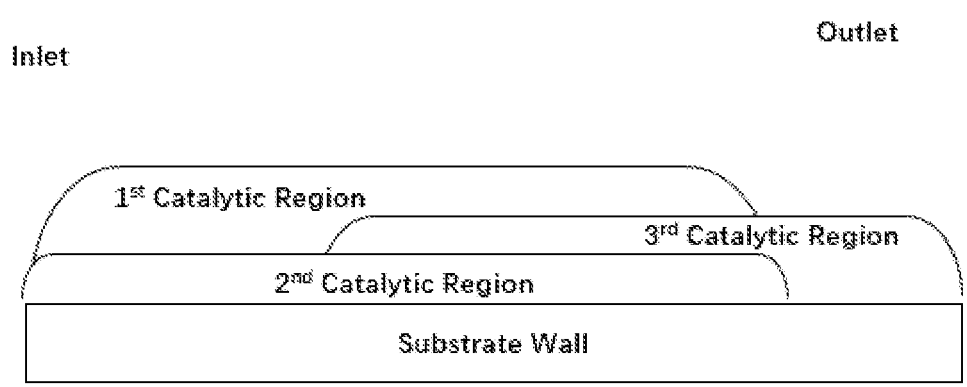
Figure 7J:
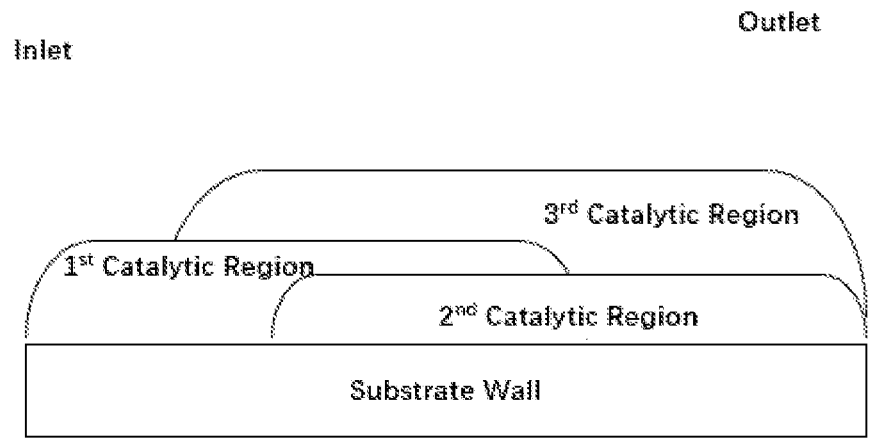
FIG. 7j shows one embodiment according to the present invention, the first catalytic region extends less than 100% of the axial length L, from the inlet end; the second catalytic region extends less than 100% of the axial length L, from the outlet end. The total length of the second and the first catalytic region can be less than, equal to, or greater than the axial length L. The $3^{rd}$ catalytic region extends less than 100% of the axial length L from the outlet end and at least partially overlies the second and/or first catalytic regions.
Figure 7K:
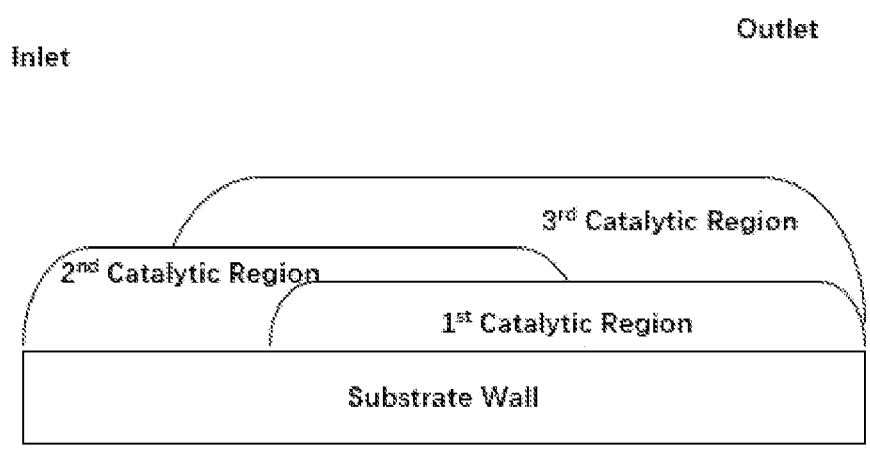
FIGS. 7k and 7l depict variations of FIG. 7j.
Figure 7L:
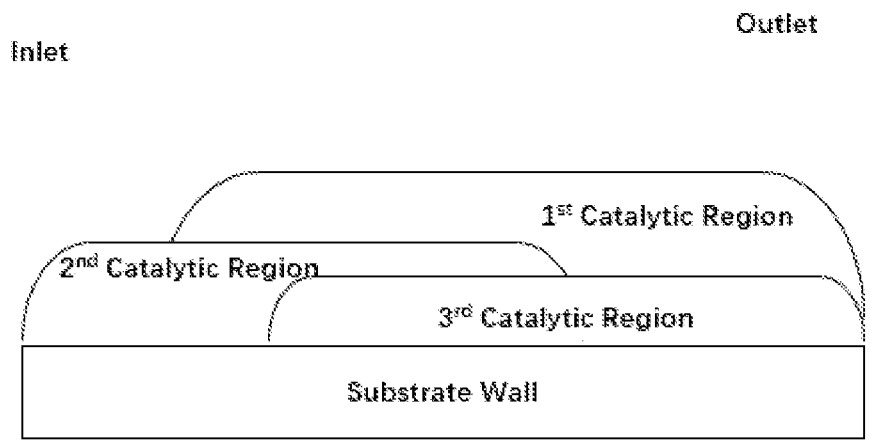

The second catalytic region can overlap with the first catalytic region for 0.1 to 99 percent of the axial length L (e.g., see FIGS. 3c and 3d, the first catalytic region can overlie the second catalytic region or the second catalytic region can overlie the first catalytic region). Alternatively, the total length of the second catalytic region and the first catalytic region can equal to the axial length L (e.g., see FIGS. 3a and 3b). In yet another alternative, total the length of the second catalytic region and the first catalytic region can be less than the axial length L, for example, no greater than 95%, 90%, 80%, or 70% of the axial length L.

In some embodiments, the first catalytic region can be supported/deposited directly on the substrate. In certain embodiments, the second catalytic region can be supported/deposited directly on the substrate.

Third Catalytic Region

The catalytic article may further comprise a third catalytic region.

The third catalytic region can further comprise a third PGM component, a third oxygen storage capacity (OSC) material, a third alkali or alkaline earth metal component, and/or a third inorganic oxide.

The third PGM component can be selected from the group consisting of platinum, palladium, rhodium, and a mixture thereof. In some embodiments, the third PGM component can be Pd, Rh or a mixture thereof.

The third OSC material can be cerium oxide, zirconium oxide, a ceria-zirconia mixed oxide, an alumina-ceria-zirconia mixed oxide, or a combination thereof. More preferably, the third OSC material comprises the ceria-zirconia mixed oxide, the alumina-ceria-zirconia mixed oxide, or a combination thereof. In addition, the third OSC material may further comprise one or more of dopants like lanthanum, neodymium, praseodymium, yttrium etc. Moreover, the third OSC material may have the function as a support material for the third PGM component. In some embodiments, the third OSC material comprises the ceria-zirconia mixed oxide and the alumina-ceria-zirconia mixed oxide.

The ceria-zirconia mixed oxide can have a weight ratio of zirconia to ceria at least 50:50; preferably, higher than 60:40; more preferably, higher than 75:25. Alternatively, the ceria-zirconia mixed oxide also can have a weight ratio of ceria to zirconia less than 50:50; preferably, less than 40:60; more preferably, less than 25:75.

The third OSC material (e.g., ceria-zirconia mixed oxide) can be from 10 to 90 wt. %; preferably, 25-75 wt. %; more preferably, 30-60 wt. %, based on the total washcoat loading of the third catalytic region.

The third OSC material loading in the third catalytic region can be less than 1.5 $g/in^3$. In some embodiments, the third OSC material loading in the second catalytic region is no greater than 1.2 $g/in^3$, 1.0 $g/in^3$, 0.9 $g/in^3$, 0.8 $g/in^3$, or 0.7 $g/in^3$.

The total washcoat loading of the third catalytic region can be less than 3.5 $g/in^3$; preferably, no more than 3.0 $g/in^3$, 2.5 $g/in^3$, or 2 $g/in^3$.

The third alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the third catalytic region.

It is even more preferable that the third alkali or alkaline earth metal is strontium. The strontium, where present, is preferably present in an amount of 0.1 to 15 wt. %, and more preferably 3 to 10 wt. %, based on the total weight of the third catalytic region.

It is also preferable that the third alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the third catalytic region. It is more preferable that the third alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

The third inorganic oxide is preferably an oxide of Groups 2, 3, 4, 5, 13 and 14 elements. The third inorganic oxide is preferably selected from the group consisting of alumina, magnesia, silica, zirconia, barium oxides, and mixed oxides or composite oxides thereof. Particularly preferably, the third inorganic oxide is alumina, lanthanum-alumina, zirconia, or a magnesia/alumina composite oxide. One especially preferred third inorganic oxide is alumina or lanthanum-alumina.

The third OSC material and the third inorganic oxide can have a weight ratio of no greater than 10:1; preferably, no greater than 8:1 or 5:1; more preferably, no greater than 4:1 or 3:1; most preferably, no greater than 2:1.

Alternatively, the third OSC material and the third inorganic oxide can have a weight ratio of 10:1 to 1:10; preferably, 8:1 to 1:8 or 5:1 to 1:5; more preferably, 4:1 to 1:4 or 3:1 to 1:3; and most preferably, 2:1 to 1:2.

In some embodiments, the third OSC material and the third inorganic oxide can have a weight ratio of no less than 2:1. In further embodiments, the third OSC material and the third inorganic oxide can have a weight ratio of no less than 10:1. In another further embodiments, the third OSC material and the third inorganic oxide can have a weight ratio of no less than 20:1 or no less than 30:1. In yet another further embodiments, the third OSC material and the third inorganic oxide can have a weight ratio of no less than 40:1 or no less than 50:1.

In some embodiments, the third catalytic region can comprise up to 5 wt. % Sn.

Tin (Sn) can be incorporated into the third catalytic region in various ways. In some embodiments, Sn can be incorporated into the third OSC material as dopant and the third OSC material can comprise up to 5 wt. % Sn; preferably, up to 4 wt. % Sn; more preferably, up to 3 wt. % Sn; even more preferably, up to 2 wt. % Sn, based on the total weight of the third OSC material. Alternatively, the third OSC material can comprise 0.1 to 5 wt. % Sn; preferably, 0.2 to 4 wt. % Sn; more preferably, 0.3 to 3 wt. % Sn; even more preferably, 0.4 to 2 wt. % Sn, based on the total weight of the third OSC material. In other embodiments, Sn can be incorporated into the third inorganic oxide as dopant and the third inorganic oxide can comprise up to 5 wt. % Sn; preferably, up to 4 wt. % Sn; more preferably, up to 3 wt. % Sn; even more preferably, up to 2 wt. % Sn, based on the total weight of the third inorganic oxide. Alternatively, the third inorganic oxide can comprise 0.1 to 5 wt. % Sn; preferably, 0.2 to 4 wt. % Sn; more preferably, 0.3 to 3 wt. % Sn; even more preferably, 0.4 to 2 wt. % Sn, based on the total weight of the third inorganic oxide. In yet other embodiments, Sn can be incorporated into the third catalytic region as simple physical mixture (e.g., physical blend). For example, Sn can be incorporated as $SnO_2$ to be physically blended with the third OSC material and/or the third inorganic oxide and the third catalytic region can comprise up to 5 wt. % Sn; preferably, up to 4 wt. % Sn; more preferably, up to 3 wt. % Sn; even more preferably, up to 2 wt. % Sn, based on the total weight of the third catalytic region. Alternatively, the third catalytic region can comprise 0.1 to 5 wt. % Sn; preferably, 0.2 to 4 wt. % Sn; more preferably, 0.3 to 3 wt. % Sn; even more preferably, 0.4 to 1.5 wt. % Sn, based on the total weight of the third catalytic region. In other embodiments, Sn can be incorporated into the third OSC material framework (e.g., Sn doped into crystal lattice of OSC solid solution material as formed) and the third OSC material framework can comprise up to 5 wt. % Sn; preferably, up to 4 wt. % Sn; more preferably, up to 3 wt. % Sn; even more preferably, up to 2 wt. % Sn. Alternatively, the third OSC material can comprise 0.1 to 5 wt. % Sn; preferably, up 0.1 to 4 wt. % Sn; more preferably, 0.1 to 3 wt. % Sn; even more preferably, 0.1 to 2.5 wt. % Sn, based on the total weight of the weight of the third OSC material.

In some embodiments, the third catalytic region can comprise up to 5 wt. % Sn; preferably, up to 3 wt. % Sn; more preferably, up to 2 wt. % Sn or up to 1 wt. % Sn, based on the total weight of the third catalytic region. Alternatively, the third catalytic region can comprise 0.1 to 5 wt. % Sn; preferably, 0.2 to 4 wt. % Sn; more preferably, 0.3 to 3 wt. % Sn; even more preferably, 0.4 to 1.5 wt. % Sn, based on the total weight of the third catalytic region.

The third catalytic region can extend for 100 percent of the axial length L (e.g., see FIGS. 4a-4d and 6a-6c).

The third catalytic region can be less than the axial length L, for example, no greater than 95%, 90%, 80%, or 70% of the axial length L (e.g., see FIGS. 5a-5d and 7g-7l).

The second catalytic region can overlap with the first catalytic region for 0.1 to 99 percent of the axial length L (e.g., see FIGS. 7a-7l), the first catalytic region can overlie the second catalytic region, or the second catalytic region can overlie the first catalytic region). Alternatively, the either of second or first region can extend for 30 to 70 percent of the axial length L. Preferably, for 40 to 60 percent, more preferably, 45 to 55 percent of the axial length L. and most preferably, the total length of the second and the first region is equal or less than the axial length L (e.g., see FIGS. 4a-4d).

Fourth Catalytic Region

The catalytic article may further comprise a fourth catalytic region.

The fourth catalytic region can further comprise a fourth PGM component, a fourth oxygen storage capacity (OSC) material, a fourth alkali or alkaline earth metal component, and/or a fourth inorganic oxide.

The fourth PGM component can be selected from the group consisting of platinum, palladium, rhodium, and a mixture thereof. In some embodiments, the fourth PGM component can be Pd, Rh or a mixture thereof.

The fourth catalytic region may have the same or similar composition as the third catalytic region.

The fourth catalytic region can be less than the axial length L, for example, no greater than 95%, 90%, 80%, or 70% of the axial length L.

Alternatively, either of fourth or the third catalytic region can extend for 30 to 70 percent of the axial length L. Preferably, for 40 to 60 percent, more preferably, 45 to 55 percent of the axial length L. and most preferably, the total length of the fourth and the third catalytic region is equal or greater than the axial length L (e.g., see FIGS. 5a-5d).

The catalyst article of the invention may comprise further components that are known to the skilled person. For example, the compositions of the invention may further comprise at least one binder and/or at least one surfactant. Where a binder is present, dispersible alumina binders are preferred.

Substrate

Preferably the substrate is a flow-through monolith. Alternatively, the substrate can be a wall-flow filter.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Another aspect of the present disclosure is directed to a method for treating a vehicular exhaust gas containing $NO_x$, CO, and HC using the catalyst article described herein. Catalytic converters equipped with the TWC made according to this method show improved catalytic properties compared to conventional TWC (with the same PGM loading), also show especially improved performance in cold start stage and better THC light off performance (e.g., see Examples 2-4 and 6-7; and Tables 3-5 and 7-9).

Another aspect of the present disclosure is directed to a system for treating vehicular exhaust gas comprising the catalyst article described herein in conjunction with a conduit for transferring the exhaust gas through the system.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g., region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or (b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or (b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of g/ft$^3$ on a metal weight basis.

The following examples merely illustrate the invention. Those skilled in the art will recognize many variations that are within the spirit of the invention and scope of the claims.

EXAMPLES

Example 1—Improved Osc Performance by Sn Doping OSCs 1-6

The six OSC materials: OSC1-6 in Table 1 were prepared by impregnation of a solved Sn solution onto rare-earth-oxide stabilized Ce/Zr mixed oxide materials, and subsequent calcination at 500° C.

The OSC performance of the Sn-doped Ce/Zr mixed oxide materials was identified by measuring weight loss of the fully oxidized materials under $H_2$ reducing condition, originating from the oxygen release, using thermo-gravity analysis. The amount (mol) of released oxygen molecule was calculated by the weight loss at lower temperature of 200° C. and higher temperature of 600° C., respectively, after redox ageing at 1000° C. for 4 hours. The significant improvement of the OSC performance was obtained at the range of Sn content between 0.1% and 1.5%.

TABLE 1

OSC Material Compositions and OSC Performance

| | $CeO_2$ (wt %) | ZrO2 (wt %) | $SnO_2$ (wt %) | OSC at 200° C. (umol/g) | OSC at 600° C. (umol/g) |
|---|---|---|---|---|---|
| OSC1 (comparative) | 50 | 43 | 0 | 0 | 281 |
| OSC2 | 50 | 43 | 0.1 | 49 | 471 |
| OSC3 | 50 | 43 | 0.5 | 56 | 457 |
| OSC4 | 50 | 43 | 1.0 | 46 | 540 |
| OSC5 | 49 | 42 | 1.5 | 28 | 520 |
| OSC6 | 46 | 40 | 5.0 | 21 | 329 |

Example 2—Improved Catalyst Performance

Comparative Catalyst 1

Comparative Catalyst 1 is a coated catalyst on a cordierite substrate, consisting of 3 wt. % Pd and 5 wt. % Ba, supported on mixture of La-stabilized alumina and OSC1 as described in Table 1, with a total washcoat loading of 2.0 g/in$^3$.

Catalyst 2

Catalyst 2 is a coated catalyst on a cordierite substrate, consisting of 3 wt. % Pd supported on mixture of La-stabilized alumina and OSC5 as described in Table 1, with a Sn loading of 0.8 wt. %, based on the total weight of the Catalyst 2 composition; and a total washcoat loading of 2.0 g/in$^3$.

Catalyst performance testing was performed on Comparative Catalyst 1 and Catalyst 2 under the following conditions, using a simulated exhaust gas having the composition shown in Table 2.

In the catalyst performance testing, the temperature at which 50% of each of the HC and CO components was converted was evaluated as $T_{50}$. The lower the temperature at which 50% was converted means the better performance as an exhaust gas purification catalyst.

In the catalyst performance testing, the gas flow rate was set at a spatial velocity of 100,000/hr, the temperature was raised from 100° C. to 400° C. at a heating rate of 25° C./min, the gas composition after passing through the catalyst was analyzed and the conversion rate was measured.

TABLE 2

Simulated Gas Composition for the Performance Test

| $C_3H_6$ (ppm) | CO (%) | $H_2$ (%) | $NO_x$ (PPm) | $O_2$ (%) | $CO_2$ (%) | $H_2O$ (%) | $N_2$ |
|---|---|---|---|---|---|---|---|
| 430 | 0.6 | 0.2 | 1000 | 0.6 | 15 | 10 | Balance |

TABLE 3

Catalytic Conversion Performance of the Coated Pd Catalyst

| | HC $T_{50}$ (° C.) | CO $T_{50}$ (° C.) |
|---|---|---|
| Comparative Catalyst 1 | 252 | 264 |
| Catalyst 2 | 239 | 242 |

As shown in Table 3 above, the temperatures at conversion of 50% for HC and CO, were lower for Catalyst 2 by 13 and 22° C. respectively, compared with Comparative Catalyst 1.

Example 3: Light Off Performances and OSC Test in Synthetic Catalyst Activity Testing Comparative Catalyst A:
First Catalytic Region:
The first catalytic region consists of Pt supported on a washcoat of CeZr mixed oxide, alumina-ceria-zirconia mixed oxide, La-stabilized alumina, and Ba promotor. The washcoat loading of the first catalytic region was about 1.8 g/in$^3$ with a Pt loading of 42 g/ft$^3$.

This washcoat was then coated from the inlet face of a ceramic substrate (600 cpsi, 4.3 mil wall thickness) using standard coating procedures with coating depth targeted of 80% of the substrate length, dried at 100° C.
Second Catalytic Region:
The second catalytic region consists of Rh supported on a washcoat of CeZr mixed oxide, and La-stabilized alumina. The washcoat loading of the second catalytic region was about 1.3 g/in$^3$ with a Rh loading of 8 g/ft$^3$.

This second washcoat was then coated from the outlet face of the ceramic substrate containing the first catalytic region from above, using standard coating procedures with coating depth targeted of 80% of the substrate length, dried at 100° C. and calcined at 500° C. for 45 mins.
Catalyst B:
Catalyst B is prepared according to the similar procedure as Comparative Catalyst A with the exception that in the first catalytic region, 2 wt. % Sn was supported on the alumina-ceria-zirconia mixed oxide, with the Sn loading of 0.7 wt. % based on the total weight of the first catalytic region.

Catalysts B and Comparative Catalyst A were tested separately over a Synthetic Catalyst Activity Test (SCAT) device. The light off performance was tested in a gas flow of 10 vol. % H$_2$O+14 vol. % CO$_2$+333 ppm C$_3$H$_6$+167 ppm C$_3$H$_8$+1.5 vol. % CO+0.5 vol. % H$_2$O+1.15 vol. % O$_2$+1000 ppm NO balanced with N$_2$ (the space velocity was 60000 h$^{-1}$), and temperature ramp is 30° C./min. The conversion of THC, CO and NO$_x$ were calculated from comparing the concentration of the feed gas and the gas at the outlets of the catalysts. The OSC was test in a gas flow of 10 vol. % H$_2$O+14 vol. % CO$_2$+333 ppm C$_3$H$_6$+167 ppm C$_3$H$_8$+0.5 vol. % CO+0.5 vol. % H$_2$O+0.5 vol. % O$_2$+1000 ppm NO balanced with N$_2$ (the space velocity was 60000 h$^{-1}$) at 450° C. Comparative Catalyst A and Catalyst B were hydrothermal aged for 6 hours in a 5 L/min flow of 2 vol. % O$_2$+10 vol. % H$_2$O balanced with N$_2$ at 1050° C.

The HC, CO and NO$_x$ $T_{50}$ light off temperatures and OSCs of fresh and aged Catalyst B and Comparative Catalyst A are shown in Table 4. The data indicates that, surprisingly, fresh Catalyst B of the present invention gave significantly improved light-off performance when compared with Comparative Catalyst A, with about 17, 10.5 and 6° C. lower $T_{50}$ ($T_{50}$ is the temperature when the conversion reaching 50%) for CO, HC and NO$_x$, respectively. Meanwhile, the OSC of Catalyst B is higher than that of Comparative Catalyst A both under fresh and aged state.

TABLE 4

SCAT Light Off and OSC Test Results

| | $T_{50}$ (° C.) | | | Oxygen Storage |
|---|---|---|---|---|
| | CO | HC | NO$_x$ | Capacity (mg) |
| Catalyst B-fresh | 153.5 | 170 | 167 | 18.7 |
| Comparative Catalyst A-fresh | 170.5 | 180.5 | 173 | 16.5 |
| Catalyst B-aged | 280.5 | 288.5 | 278.5 | 5.6 |
| Comparative Catalyst A-aged | 280.5 | 284 | 278.5 | 2.2 |

Example 4: Light Off Performances Test in Synthetic Catalyst Activity Testing Comparative Catalyst C:
First Catalytic Region:
The first catalytic region consists of Pt supported on a washcoat of CeZr mixed oxide, alumina-ceria-zirconia mixed oxide and La-stabilized alumina. The washcoat loading of the first catalytic region was about 2.0 g/in$^3$ with a Pt loading of 74 g/ft$^3$.

This washcoat was then coated from the inlet face of a ceramic substrate (600 cpsi, 2.5 mil wall thickness) using standard coating procedures with coating depth targeted of 50% of the substrate length, dried at 100° C.
Second Catalytic Region:
The second catalytic region consists of Pt supported on a washcoat of CeZr mixed oxide, alumina-ceria-zirconia mixed oxide and La-stabilized alumina. The washcoat loading of the second catalytic region was about 2.0 g/in$^3$ with a Pt loading of 24 g/ft$^3$.

This second washcoat was then coated from the outlet face of the ceramic substrate containing the first catalytic region from above, using standard coating procedures with coating depth targeted of 50% of the substrate length, dried at 100° C. and calcined at 500° C. for 45 mins.
Third Catalytic Region:
The third catalytic region consists of Rh supported on a washcoat of CeZr mixed oxide and La-stabilized alumina. The washcoat loading of the third catalytic region was about 1.5 g/in$^3$ with a Rh loading of 6 g/ft$^3$.

The third washcoat was then coated from the outlet face of the ceramic substrate containing the first and the second catalytic regions from above, using standard coating procedures with total coating depth targeted of 100% of the substrate length, dried at 100° C. and calcined at 500° C. for 45 mins.
Catalyst D:
Catalyst D is prepared according to the similar procedure as Comparative Catalyst C with the exception that in the first and second catalytic region, 2 wt. % Sn was supported on the alumina-ceria-zirconia mixed oxide, with the Sn loading of 0.75 wt. % based on the weight of either the first or the second catalytic region.

Catalyst D and Comparative Catalyst C were tested separately over a Synthetic Catalyst Activity Test (SCAT) device. The light off performance is tested in a gas flow of 10 vol. % H$_2$O+14 vol. % CO$_2$+333 ppm C$_3$H$_6$+167 ppm C$_3$H$_8$+1.5 vol. % CO+0.5 vol. % H$_2$O+1.15 vol. % O$_2$+1000 ppm NO balanced with N$_2$ (the space velocity was 60000 h$^{-1}$), and temperature ramp is 30° C./min. The conversion of THC, CO and NO$_x$ were calculated from comparing the concentration of the feed gas and the gas at the outlets of the catalysts. Catalyst D and Comparative Catalyst C were hydrothermal aged for 6 hours in a 5 L/min flow of 2 vol. % $O_2$+10 vol. % $H_2O$ balanced with $N_2$ at 1050° C.

The HC, CO and $NO_x$ $T_{50}$ light off temperatures of fresh and aged Catalyst D and Comparative Catalyst C are shown in Table 5. The data indicates that remarkably improved light off performances are exhibited by Catalyst D of the present invention, compared with Comparative Catalyst C, both under fresh and aged state. The CO, HC and $NO_x$ $T_{50}$ of Catalyst D were lowered by 17.5, 11, and 9° C., respectively, under fresh state; and by 19, 16.5, and 14.5° C., respectively, under aged state.

TABLE 5

SCAT Light Off Test Results

| | $T_{50}$ (° C.) | | |
|---|---|---|---|
| | CO | HC | $NO_x$ |
| Catalyst D-fresh | 135 | 153 | 157 |
| Comparative Catalyst C-fresh | 152.5 | 164 | 166 |
| Catalyst D-aged | 211 | 217 | 215.5 |
| Comparative Catalyst C-aged | 230 | 233.5 | 230 |

Example 5: PT Dispersion Characterization

Comparative Catalyst E:
First Catalytic Region:

The first catalytic region consists of Pt supported on a washcoat of CeZr mixed oxide, alumina-ceria-zirconia mixed oxide and La-stabilized alumina. The washcoat loading of the first catalytic region was about 2.0 g/in³ with a Pt loading of 74 g/ft³.

This washcoat was then coated from the inlet face of a ceramic substrate (600 cpsi, 2.5 mil wall thickness) using standard coating procedures with coating depth targeted of 100% of the substrate length, dried at 100° C. and calcined at 500° C. for 45 mins.

Catalyst F:

Catalyst F was prepared according to the similar procedure as Comparative Catalyst E with the exception that in the first catalytic region, 2 wt. % Sn was supported on the alumina-ceria-zirconia mixed oxide, with the Sn loading of 0.75 wt. % based on the weight of the total first catalytic region.

Pt dispersion of Catalyst F and Comparative Catalyst E was tested separately by CO-pulse chemisorption measurements at 50° C. The catalysts were pre-treated with $H_2$ gas for 10 mins at 300° C. prior to CO pulse. A 1:1 ratio of CO:Pt was used to estimate the dispersion. Before CO-pulse chemisorption tests, Catalyst F and Comparative Catalyst E were hydrothermal aged for 6 hours in a 5 L/min flow of 2 vol. % $O_2$+10 vol. % $H_2O$ balanced with $N_2$ at 1050° C. Pt dispersion results are shown in Table 6. The data demonstrate that Catalyst F has an about 6 times of Pt dispersion as that in Comparative Catalyst E after hydrothermal ageing.

TABLE 6

Pt Dispersion Results

| | Pt dispersion (%) |
|---|---|
| Catalyst F | 1.9 |
| Comparative Catalyst E | 0.3 |

Example 6: Vehicle Testing Procedures and Results

Comparative Catalyst G:
First Catalytic Region:

The first catalytic region consists of Pt supported on a washcoat of CeZr mixed oxide, alumina-ceria-zirconia mixed oxide and La-stabilized alumina. The washcoat loading of the first catalytic region was about 2.5 g/in³ with a Pt loading of 74 g/ft³.

This washcoat was then coated from the inlet face of a ceramic substrate (600 cpsi, 2.5 mil wall thickness) using standard coating procedures with coating depth targeted of 50% of the substrate length, dried at 100° C.

Second Catalytic Region:

The second catalytic region consists of Pt supported on a washcoat of CeZr mixed oxide, alumina-ceria-zirconia mixed oxide and La-stabilized alumina. The washcoat loading of the second catalytic region was about 2.5 g/in³ with a Pt loading of 24 g/ft³.

This second washcoat was then coated from the outlet face of the ceramic substrate containing the first catalytic region from above, using standard coating procedures with coating depth targeted of 50% of the substrate length, dried at 100° C. and calcined at 500° C. for 45 mins.

Third Catalytic Region:

The third catalytic region consists of Rh supported on a washcoat of CeZr mixed oxide and La-stabilized alumina. The washcoat loading of the third catalytic region was about 1.5 g/in³ with a Rh loading of 6 g/ft³.

The third washcoat was then coated from the outlet face of the ceramic substrate containing the first and the second catalytic regions from above, using standard coating procedures with total coating depth targeted of 100% of the substrate length, dried at 100° C. and calcined at 500° C. for 45 mins.

Catalyst H:

Catalyst H was prepared according to the similar procedure as Comparative Catalyst G with the exception that in the first and second catalytic region, 2 wt. % Sn was supported on the alumina-ceria-zirconia mixed oxide, with the Sn loading of 0.75 wt. % based on the total weight of either the first or the second catalytic region.

The bench aged samples of Catalyst H and Comparative Catalyst G were tested over a vehicle of 1.5-liter engine with Worldwide Light Duty Testing Procedure (WLTP). The bench aging under 6.1-L engine in the same run for 200 hrs with four mode aging cycle, with peak bed temperature at about 980° C. in the catalysts. Results of vehicle exhaust diluted bag data over bench aged parts are shown in Table 7. Catalyst H of the present invention presents excellent activities on THC and $NO_x$ emission control, compared with Comparative Catalyst G (e.g., see the THC and $NO_x$ performances improved with around 27% and 46%, respectively).

TABLE 7

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst G-aged | 210.3 | 174 | 270.5 | 172.5 |
| Catalyst H-aged | 154.4 | 125.3 | 283.6 | 93.3 |

Example 7: Vehicle Testing Procedures and Results

The bench aged samples of Catalyst H and Comparative Catalyst G were tested over a vehicle of 1.5-liter engine with Worldwide Light Duty Testing Procedure (WLTP). The bench aging is under 6.1-L engine in the same run for 200 hrs with four mode aging cycle, with peak bed temperature at about 980° C. in the catalysts. Results of vehicle exhaust diluted bag data over bench aged parts are shown in Table 8. Catalyst H of the present invention presented excellent activities on THC, CO and $NO_x$ emission control, compared with Comparative Catalyst G (e.g., see the THC, CO and $NO_x$ performances improved with around 57%, 20%, and 64%, respectively).

TABLE 8

Results of Emissions by Vehicle Diluted Bag Data

| | Exhaust Emissions (mg/km) | | | |
|---|---|---|---|---|
| | THC | NMHC | CO/10 | $NO_x$ |
| Comparative Catalyst G-aged | 92.3 | 70.2 | 68.8 | 84.8 |
| Catalyst H-aged | 39.4 | 30.4 | 54.9 | 30.3 |

Example 8: Light Off Performances Test in Engine Testing

Comparative Catalyst I:
First Catalytic Region:

The first catalytic region consists of Pt supported on a washcoat of CeZr mixed oxide and La-stabilized alumina. The washcoat loading of the first catalytic region was about 2.3 g/in³ with a Pt loading of 49 g/ft³.

This washcoat was then coated from the inlet face of a ceramic substrate (600 cpsi, 2.5 mil wall thickness) using standard coating procedures with coating depth targeted of 100% of the substrate length, dried at 100° C. and calcined at 500° C. for 45 mins.

Catalyst J:

Catalyst J was prepared according to the similar procedure as Comparative Catalyst I with the exception that in the first catalytic region, $SnO_2$ powders was added directly into the washcoat by the physical blending, with the Sn loading around 1 wt. %, based on the total weight of the first catalytic region.

The bench aged Catalyst J and Comparative Catalyst I were tested separately over a gasoline engine. The light off performance is a typical condition with the exhaust gas flow rate of 80 kg/hr, temperature ramp is 30° C./min, the lambda of Air and Fuel Ratio (AFR) at 14.45. the conversion of THC and CO were calculated from comparing the concentration of the feed gas and the gas at the outlets of the catalysts. Before the engine light off testing, Catalysts H and Comparative Catalyst G were bench aged for 200 hours. The bench aging is under 6.1-L engine in the same run for 200 hrs with four mode aging cycle, with peak bed temperature at about 950° C. in the catalysts.

The HC and CO $T_{10}$ light off temperatures ($T_{10}$ is the temperature when the conversion reaching 10%) of Catalyst J and Comparative Catalyst I are shown in Table 9. The data indicate that Catalyst J showed significant improved light off performances for HC and CO. Compared with Comparative Catalyst I, $T_{10}$ over Catalyst J was lowered by about 40° C.

TABLE 9

Engine Bench Light Off Test Results

| Pollutant | $T_{10}$ (° C.) Catalyst J | $T_{10}$ (° C.) Comparative Catalyst I |
|---|---|---|
| HC | 400 | 440 |
| CO | 390 | 433 |

We claim:

1. A catalyst composition comprising a platinum group metal (PGM) component and a support material, wherein the catalyst composition comprises up to 2 wt. % Sn, and wherein the support material is an oxygen storage capacity (OSC) material and an inorganic oxide;
   wherein the OSC material is cerium oxide, a ceria-zirconia mixed oxide, an alumina-ceria-zirconia mixed oxide, or a combination thereof; and
   wherein the inorganic oxide is selected from the group consisting of alumina, magnesia, silica, zirconia, lanthana, neodymia, praseodymia, yttria, and mixed oxides or composite oxides thereof.

2. The catalyst composition of claim 1, wherein the PGM component is platinum, palladium, rhodium, or a combination thereof.

3. The catalyst composition of claim 2, wherein the PGM component is platinum.

4. The catalyst composition of claim 2, wherein the PGM component is platinum and rhodium; palladium and rhodium; or platinum, palladium, and rhodium.

5. The catalyst composition of claim 1 is a three-way catalyst (TWC).

6. The catalyst composition of claim 1, wherein the catalyst composition comprises 0.4 to 1.5 wt. % Sn.

7. The catalyst composition of claim 1, wherein the OSC material comprises the ceria-zirconia mixed oxide and the alumina-ceria-zirconia mixed oxide.

8. A catalytic article for treating exhaust gas comprising:
   a substrate comprising an inlet end and an outlet end with an axial length L;
   a first catalytic region comprising a first platinum group metal (PGM) component and a first support material, wherein the first catalytic region comprises up to 2 wt. % Sn, and wherein the first support material is a first oxygen storage capacity (OSC) material and a first inorganic oxide;
   wherein the first OSC material is cerium oxide, a ceria-zirconia mixed oxide, an alumina-ceria-zirconia mixed oxide, or a combination thereof; and
   wherein the first inorganic oxide is selected from the group consisting of alumina, magnesia, silica, zirconia, lanthana, neodymia, praseodymia, yttria, and mixed oxides or composite oxides thereof.

9. The catalytic article of claim 8, wherein the first PGM component is platinum, palladium, rhodium, or a combination thereof.

10. The catalytic article of claim 9, wherein the first PGM component is platinum.

11. The catalytic article of claim 9, wherein the first PGM component is platinum and rhodium; palladium and rhodium; or platinum, palladium, and rhodium.

12. The catalytic article of claim 8 is a three-way catalyst (TWC).

13. The catalytic article of claim 8, further comprising a second catalytic region.

14. The catalytic article of claim 13, wherein the second catalytic region comprises up to 5 wt. % Sn.

15. The catalytic article of claim 13, further comprising a third catalytic region.

16. The catalytic article of claim 15, wherein the third catalytic region comprises up to 5 wt. % Sn.

17. The catalytic article of claim 8, wherein the first catalytic region comprises 0.4 to 1.5 wt. % Sn.

18. The catalytic article of claim 8, wherein the first OSC material comprises the ceria-zirconia mixed oxide and the alumina-ceria-zirconia mixed oxide.

19. The catalytic article of claim 8, wherein the first catalytic region comprises up to 1.5 wt. % Sn.

20. The catalytic article of claim 19, wherein the first catalytic region comprises up to 1 wt. % Sn.

* * * * *